Fig_3

Fig.6a

INVENTOR.
LESTER A. DOWDALL
WALTER DEEGE
BY
Roger A. Marrs

Oct. 21, 1969 L. A. DOWDALL ET AL 3,474,359
WAVEGUIDE POWER DIVIDER HAVING TAPERED, PIVOTAL
SWITCHING MEMBER
Filed Aug. 28, 1967 5 Sheets-Sheet 4

INVENTORS
LESTER A. DOWDALL
WALTER DEEGE
BY
Roger G. Marrs

INVENTORS
LESTER A. DOWDALL
WALTER DEEGE

United States Patent Office 3,474,359
Patented Oct. 21, 1969

3,474,359
WAVEGUIDE POWER DIVIDER HAVING TAPERED, PIVOTAL SWITCHING MEMBER
Lester A. Dowdall, Carpinteria, and Walter Deege, Reseda, Calif., assignors to Transco Products, Inc., Venice, Calif., a corporation of California
Filed Aug. 28, 1967, Ser. No. 663,781
Int. Cl. H01p 5/12
U.S. Cl. 333—7   29 Claims

ABSTRACT OF THE DISCLOSURE

A microwave power divider is disclosed herein having a branched waveguide formed in a housing and an angularly positionable switching member situated at the apex of the waveguide. In one embodiment, the curvature of the outer wall of each waveguide branch is defined by a pair of intersecting arcs. Similarly, the curvature of the inner wall of each waveguide is defined by a second pair of intersecting arcs, one arc defining the curvature of the blade portion of the switching member. A pair of disc-shaped rotors, coaxial with the switching member defines the top and bottom surfaces of the waveguide branches and rotate in unison with the switching member for the positioning thereof. The tip of the switching member blade portion may be flexible. The angular orientation of the switching member determines the fraction of the total input power distributed to each output port.

BACKGROUND OF THE INVENTION

Field of the invention

The present invention relates to a microwave power divider and, more particularly, to a novel power divider having a housing formed with a branched waveguide, the walls of which exhibit compound curvatures, and having a switching member adapted to distribute the power output between a plurality of antennas.

Description of the prior art

In many microwave applications, it is necessary to distribute electrical energy input signal from a single source between several output loads. For example, it may be necessary to switch the power output of a radar transmitter from one antenna to another antenna, or to divide the transmitter power equally or unequally between two or more loads.

In the past, various waveguide power divider configurations have been suggested, the simplest of which utilizes a Y-shaped waveguide with a swinging vane located at the branch of the Y. Such a waveguide is illustrated, for example, on page 197 of the textbook "Very High Frequency Techniques" edited by the Staff of the Radio Research Laboratory, Harvard University, Boston Technological Publishers, 1965. In this Y-type divider, the angular position of the vane determines the percentage of the input signal propagated to each branch of the Y-shaped waveguide.

Conventional Y-type power dividers have the disadvantage that the output ports are not at right angles to the input port. Further, the angle of the Y waveguide branch is critical, and since a small angle must be used for effective power division, the overall length of the power divider of necessity is large.

Other Y-type dividers are known to cause power breakdowns due to inadvertent arcing across the waveguide and the sidewalls of the swinging vane employed to divide power between a plurality of antennas.

A variation of the Y-type divider having the advantage of output ports at right angles to the input port is described on page 525 of the book entitled "Microwave Transmission Circuits" edited by George L. Ragan, McGraw-Hill Company, New York, 1948. As illustrated and described therein, this Y-type divider provided with a T-shape still is limited in minimum overall size due to the small branch angle of the Y waveguide. Moreover, such a divider is difficult to construct comprising several short, substantially rectangular waveguide sections oriented at discrete angles with the adjacent segments to form the T.

Several T-shaped power dividers have been suggested, including the rotary tap switch illustrated on page 130 of the book "Microwave Engineering" by A. F. Harvey, Academic Press, New York, 1963. As shown therein, a single input port is connected to one or the other of two output ports by means of an E-plane right angle waveguide which is rotatable about an axis perpendicular to the plane of the switch. The rotatable portion can be positioned so that the right angle waveguide connects the input port to either the left or the right hand ouput port, but not to both. Clearly, such a device is useful as a microwave power switch, but does not have the capability of dividing the input power proportionately between the two output ports.

Such a shuttle switch has a number of disadvantages. Firstly, the switch is difficult to fabricate since a complex mounting arrangement is necessary to insure that the shuttle will move smoothly transversely of the input port. Secondly, the switch cannot be operated very rapidly, because of the relatively large mass of the shuttle material limiting the time in which it can be moved from one position to another. Moreover, even in applications where the speed of switching is not critical, the shuttle itself protrudes from the otherwise smooth waveguide surface, effectively presenting an impedance mismatch to an input signal, and degrading the voltage standing wave ratio obtainable.

Moreover, in most prior art waveguide power divider configurations, a moving part such as a vane or a shuttle scrapes against the top and bottom surfaces of the waveguide. Often this results in undue erosion of the plating on the waveguide, or in actual grooving of the waveguide surfaces.

SUMMARY OF THE INVENTION

The variable microwave power divider defined herein overcomes the difficulties and problems and other limitations encountered by conventional dividers. The inventive power divider is small in size, while still having its output ports located at right angles to the input port. The rotary switching member utilized has low overall mass, thus permitting extremely rapid switching operation. In one embodiment, the arcuate sides of the switching member, and the inside walls of the waveguide together exhibit a compound curvature which results in a very low voltage standing wave ratio, and which contributes to the minimal size of the device. Moreover, by utilizing top and bottom waveguide surfaces which rotate in unison with the switching member, erosion of the waveguide surfaces due to relative motion of the switching member is effectively eliminated.

Accordingly, the inventive microwave power divider comprises a housing having a branched waveguide including output ports situated at right angles to the input port. A switching member having an arcuate sided blade portion is located at the apex of the waveguide defining the branches. The switching member is rotatable about an axis perpendicular to the plane of the waveguide to facilitate positioning of the blade portion to divide the input signal between the waveguide branches. The walls of the waveguide exhibit compound curvature defined by intersecting arcs, the curvature resulting in minimum voltage standing wave ratio and reduced overall dimensions for the divider.

A pair of rotors disposed coaxially above and below the switching member define the top and bottom walls of the waveguide. The rotors and the blade of the switching member rotate in unison so that the switching member may be driven to a desired position by the power actuation of the rotors. Utilization of RF absorptive material between the power divider body and the rotors improves isolation, as does the use of a flexible tip for the switching member which insures constant contact of the tip with the waveguide walls during switching operation.

In another embodiment, a pair of rotary switching members facilitates power division of a single input signal between a plurality of output ports. Energy bases may be reduced by incorporating elongated rollers resiliently mounted on opposite sides of the switching member to partially occupy the gap or space between the sides of the member and housing wall.

Thus, it is a primary object of the present invention to provide a novel microwave power divider having characteristics of minimum energy bases, rapid response, and maximum efficiency.

It is another object of the present invention to provide a microwave power divider utilizing a rotary switching member having arcuate sides, the switching member being situated at the apex of a branched waveguide.

Yet another object of the present invention is to provide a microwave power divider utilizing a branched waveguide, the wall of which exhibits compound curvatures.

Another object of the present invention is to provide a microwave power divider utilizing and incorporating a bladed switching member disposed in a branched waveguide having compound curvatures to achieve minimum size and minimum voltage standing wave ratio.

A further object of the present invention is to provide a microwave power divider having no relative motion between the switching member and the top and bottom surfaces of the waveguide.

Still a further object of the present invention is to provide a novel microwave power divider having at least two rotatable switching members operable in unison or separately to achieve a power signal between a plurality of selected output ports.

Yet another object of the present invention is to provide an improved microwave power divider having a housing adapted to hold a quantity of RF absorptive material in close proximity to the energy carrying channels constituting the waveguide for reducing adverse effects of isolation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

Figure 1:
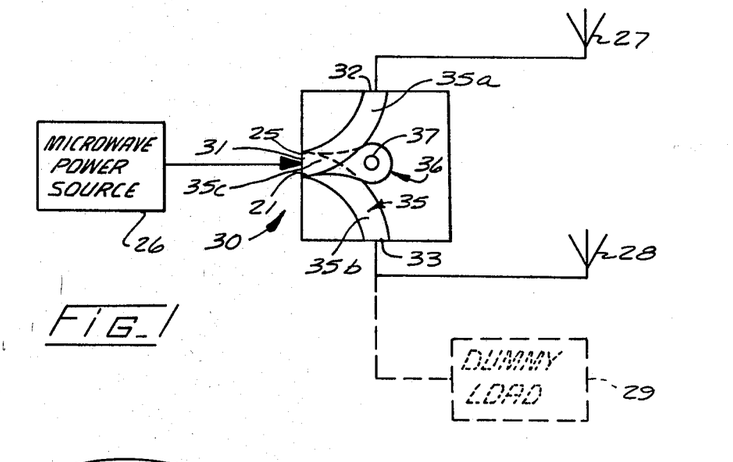
FIGURE 1 is a simplified schematic diagram showing the inventive microwave power divider as utilized in a typical system for distribution of an input RF signal between a plurality of loads.
Figures 2, 4, 5, 6:
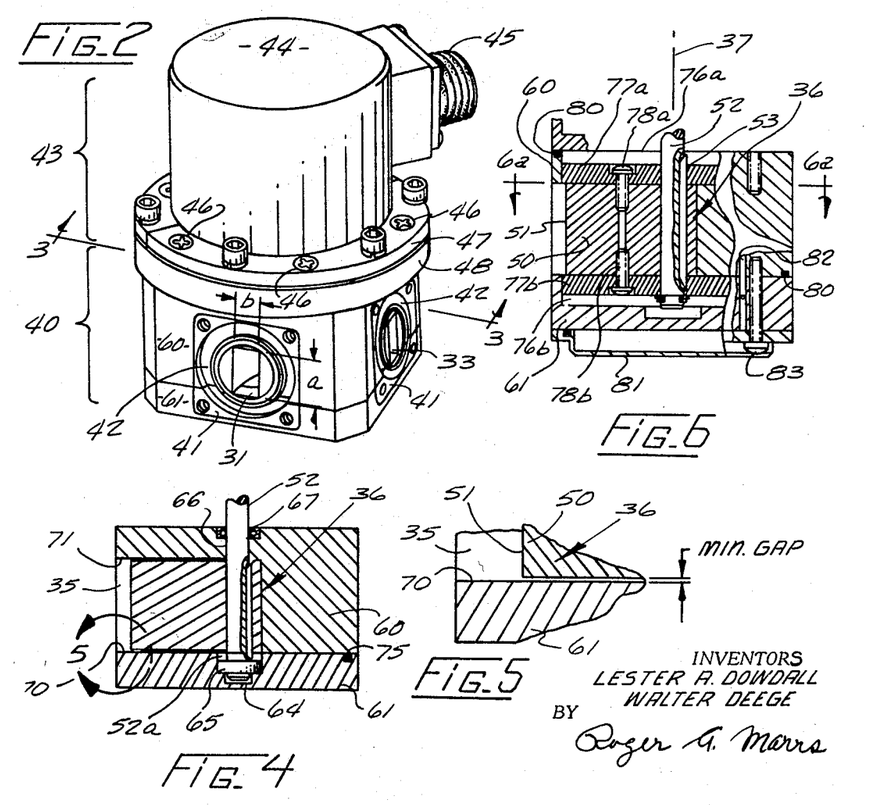
FIGURE 2 is a perspective view of a microwave power divider in accordance with the present invention and an actuator therefor.
FIGURE 4 is a sectional view of one embodiment of the inventive microwave power divider as taken generally along line 4—4 of FIGURE 3.
FIGURE 5 is a fragmentary sectional view of a portion of the switching member and microwave power divider housing as viewed generally along line 5—5 of FIGURE 4.
FIGURE 6 is a sectional view of another embodiment of the inventive microwave power divider utilizing a pair of disc-shaped rotors, angularly positionable in unison with the switching member to define the top and bottom waveguide surfaces.
Figure 3:
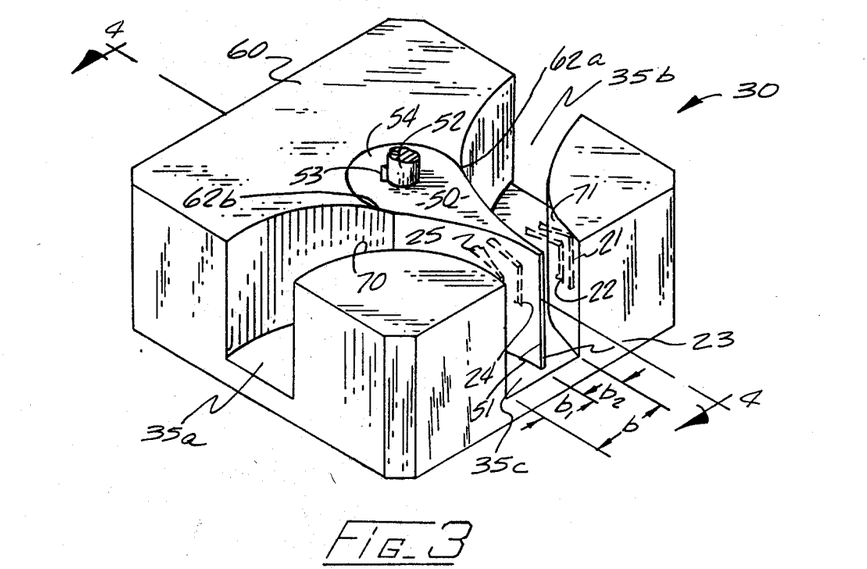
FIGURE 3 is a perspective view of the inventive microwave power divider, showing the branched waveguide and angularly positionable switching member components thereof as taken in the direction of line 3—3 of FIGURE 2.

In accordance with the present invention, a preferred embodiment of the microwave power dividing apparatus, useful for switching or distributing the power of an input signal between two loads, is shown in FIGURES 1, 2 and 3. As seen therein, a power divider indicated in the direction of arrow 30 comprises an input port 31 and output ports 32 and 33, each of which is at a right angle with respect to input port 31. The input and output ports are connected by branched waveguide 35 which includes a pair of branches 35a and 35b associated respectively with ports 32 and 33; the branches join in common with a waveguide region 35c associated with port 31. A switching member 36 is situated at the apex of branched waveguide 35 and, to accomplish power division, utilizes a blade-like partition 50 which is rotationally positionable about an axis 37.

Referring in detail to FIGURE 1, the RF microwave signal to be switched is fed to input port 31 of power divider 30 from a microwave power source 26 via an appropriate interconnecting waveguide. Power source 26 may comprise a magnetron oscillator, a radar transmitter, or the like. As discussed more fully hereinbelow, it is desirable that the input signal be in a transverse electric mode (for example, the $TE_{01}$) with its electric field perpendicular to pivot axis 37.

With switching member 36 located at position 21 (as shown in FIGURE 1) all of the input signal will propagate via waveguide branch 35a and emerge from power divider 30 via output port 32. In the example illustrated, the entire signal will be fed to an antenna 27. Alternatively, should switching member 36 be located at position 25 (as shown in phantom in FIGURE 1), all of the signal from source 26 will be propagated via branch 35b of waveguide 35 to output port 33, and hence to an antenna 28 or a dummy load 29. As will be described in detail below, when switching member 36 is located at intermediate positions 21 and 25, the input signal will be divided between the loads associated with ports 32 and 33.

FIGURE 2 illustrates the external appearance of a device incorporating the inventive power divider 30. As may be seen therein, power divider 30 is contained in lower portion 40, commonly referred to as the "RF head." Input port 31 and output ports 32 (not visible in FIGURE 2) and 33 each are provided with an appropriate flange 41 to facilitate interconnection of power divider 30 with other microwave circuitry. Disposed within each flange 41 is a circular groove 42 adapted to receive an O-ring (not shown). By using such O-rings, a pressure-tight waveguide seal may be achieved thereby allowing pressurization or evacuation of the waveguide interior.

Attached to RF head 40 is actuator unit 43 used to control the position of switching member 36. Although hidden from view by cover 44, actuator unit 43 may comprise a solenoid, a selsyn, or other device useful for rotating a shaft to a desired angular position in response to a remotely generated electrical signal. Electrical connections to actuator mechanism 43 are made via a conventional MS-type connector 45. Actuator mechanism 43 is suitably attached to RF head 40 by means of screws 46 which extend through a flange 47 into a mating flange 48. If desired, a rubber gasket may be used between flanges 47 and 48 to achieve a pressure tight seal.

Figures 10, 11, 12, 13, 17:
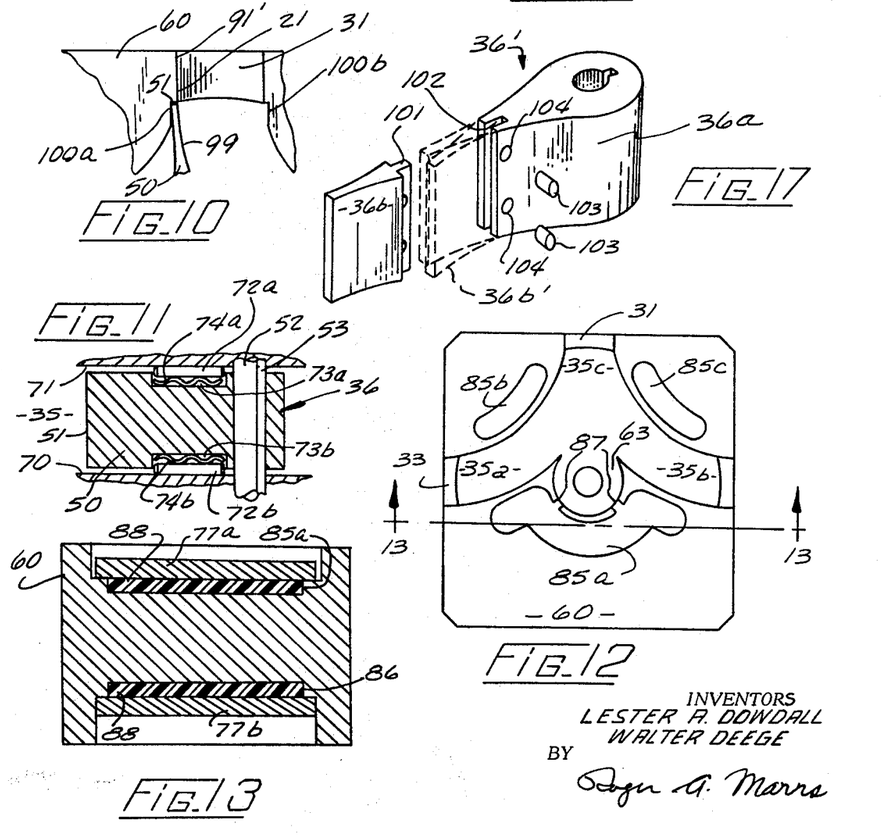
FIGURE 10 is a fragmentary sectional view as seen along line 10—10 of FIGURE 7 illustrating the notch construction of the waveguide walls.
FIGURE 11 is a sectional view of another embodiment of the power divider switching member including rollers for occupying the spacing between it and the adjacent waveguide housing wall surface.
FIGURE 12 is a simplified top view of the housing portion of the inventive microwave power divider showing the location of channels designed to contain RF absorbing material.
FIGURE 13 is a sectional view of the microwave power divider as viewed generally along lines 13—13 of FIGURE 12.
FIGURE 17 is an exploded perspective view of another embodiment of the switching member employed in the inventive microwave power divider illustrated in FIGURE 15 and having a flexible forward position.

RF head 40 may be fabricated in two major sections, a housing 60 and a bottom plate 61. As best shown in FIGURE 12, housing 60 may be milled to define branched waveguide 35 and a substantially cylindrical region 63 which movably receives switching member 36.

As evident in FIGURE 2, the height $a$ of branched waveguide 35 is greater than its width $b$. This is consistent with the preferred operation of power divider 30 wherein the electric field of the input signal is perpendicular to axis 37 (that is, parallel to the bottom of RF head 40). As is well known to those skilled in the microwave art, the height $a$ determines the lowest frequency which can be propagated in waveguide 35. For example, with an input signal in the $TE_{01}$ mode, the dimension $a$ should be one-half of the free space wavelength of the lowest frequency of operation.

Referring to FIGURE 3, note that a blade portion 50 of switching member 36 divides the common region 35c of waveguide 35 into two sections of width $b_1$ and $b_2$ (where $b_1+b_2=b$). Since the electric field is uniform across the width $b$ of the waveguide, the voltage across the waveguide will be electrically divided between branches 35a and 35b in the ratio $b_1/b_2$. In addition, the currents in the two branches are equal to each other and to the currents in the input waveguide. Therefore, branches 35a and 35b are in series with the input waveguide and the power transmitted through the two branches 35a and 35b will be in the ratio $b_1/b_2$ determined by the rotational position of switching member 36.

As mentioned earlier, when the tip 51 of switching member 36 is located at position 21, all of the input signal will be directed to output port 32. In this case, $b_1=b$ and $b_2=0$, and the power is entirely contained within branch 35a. Similarly, when tip 51 is at position 25, $b_1=0$, and all of the power is fed via branch 35b to port 33.

When switching member 36 is positioned with tip 51 at mid-position 23, $b_1=b_2$, and the input signal is equally divided between the output ports 32 and 33. When blade 50 is located at position 22 one-third between central position 23 and end position 21, $b_1=3b_2$, and the input power is divided so that the output at port 33 is down 1.4 db from that at the input, while the power at output port 32 is down 5.6 db. Similarly, when at position 24, port 33 receives two-third of the total input power, output port 32 receives one-third. Of course, switching member 36 may assume any position between the extremes of psoitions 21 and 25, and at such intermediate positions the power still will be differentially divided accordingly.

As further illustrated in FIGURE 3, switching member 36 is situated at the apex of branched waveguide 35 and is attached to a shaft 52 by means of a key 53. Key 53 insures that there will be no slip (i.e., no relative rotational motion) of switching member 36 with respect to shaft 52. Switching member 36 itself comprises a substantially cylindrical portion 54 which gradually tapers toward tip 51 to form blade portion 50. Alternately expressed, blade portion 50 truncates cylindrical portion 54 approximately on a line between a pair of spaced apart fingers 62a and 62b. The preferred curvature of the sides of blade portion 50 is discussed herein below in conjunction with FIGURE 8.

As seen in FIGURE 4, bottom plate 61 is attached to housing 60 and includes a hole 64, the lip of which supports a bearing 65. A shoulder 52a, extending from shaft 52 near its lower end, seats on bearing 65 supporting shaft 52 and permititng it to rotate freely with respect to bottom plate 61. Hole 64 is sufficiently deep to clear the end of shaft 52. The upper extending portion of shaft 52 passes through a hole 66 in housing 60 and is supported by a bearing 67. The portion of shaft 52 extending beyond housing 60 may be used to control the rotational position of switching member 36 and, for example, may be attached to actuator mechanism 43 shown in FIGURE 2.

In the embodiment of FIGURES 4 and 5, the top and bottom of waveguide 35 are defined by an upper surface 70 of bottom plate 61 and a surface 71 of housing 60. For optimum performance, the clearance between the top and bottom surfaces of switching member 36 and waveguide surfaces 70 and 71 should not be more than .002 inch. If this spacing is not maintained, blade 50 of switching member 36 will be too remote from surfaces 70 and 71, resulting in insertion losses. If the blade 50 drags against these surfaces, degradation of the power divider 30 performance may result.

One method of insuring the spacing between blade portion 50 and waveguide top and bottom surfaces 70 and 71 is illustrated in FIGURE 11. As shown therein, rollers 72a and 72b are mounted in troughs 73a and 73b cut respectively in the top and bottom surfaces of blade portion 50 of switching member 36. Wavy springs 74a and 74b are mounted within troughs 73a and 73b to bias rollers 72a and 72b away from blade 50. Furthermore, the rollers prevent RF leakage between the blade and the adjacent side walls which improves isolation.

Rollers 72a and 72b respectively ride against top and bottom surfaces 71 and 70, under the force of springs 74a and 74b, insuring smooth operation and clearance between switching member 36 and these surfaces. Typically, rollers 72a and 72b each may comprise a hard steel pin having a diameter of about .030–.060 inch, while blade portion 50 may have a height of about .010 inch less than the height $a$ of waveguide 35. As switching member 36 is rotated, the rollers will maintain close engagement, eliminating the RF losses which normally might occur. Furthermore, the embodiment of FIGURE 11 is less expensive to fabricate than that of FIGURE 4, since the dimensional tolerances are less critical.

Referring again to FIGURE 4, note that a peripheral groove 75 is provided in the top surface of bottom plate 61. Groove 75 may be filled with an appropriate sealant to result in a pressure tight seal between bottom plate 61 and housing 60.

Figure 6A:
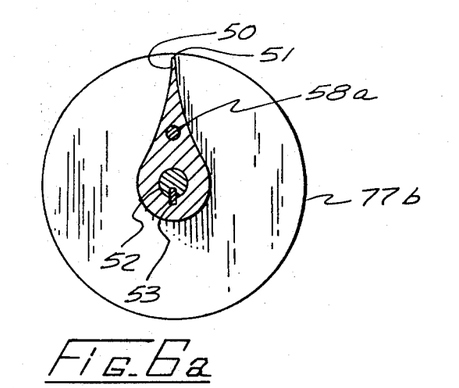
FIGURE 6a is a sectional view of the rotor mounted switching member employed in the power divider of FIGURE 6.

Another technique to eliminate the scraping due to blade 50 is to utilize a pair of disc-shaped rotors to define the top and bottom surfaces of waveguide 35. The rotors then may be rotationally positioned in unison with switching member 36. Such an embodiment is illustrated in FIGURES 6 and 6a.

Referring to FIGURE 6, note that a pair of shallow cylindrical channels 76a and 76b, each concentric with axis 37, are provided respectively in housing 60 and bottom plate 61. Situated in these channels are disc-shaped rotors 77a and 77b, which, like switching member 36, are keyed to shaft 52 by key 53. In a preferred embodiment, the diameter of rotors 77a and 77b is slightly greater than the distance between axis 37 and tip 51 of switching member 36. Screws 78a and 77b extend respectively through motors 77a and 77b into blade portion 50. Thus, key 53 and screws 78a and 78b insure that rotors 77a and 77b rotate exactly in unison with switching member 36 as shaft 52 is turned via actuator 43.

Grooves 80 are provided in housing 60 and in bottom cover 81 and may be filled with a sealant for pressurization purposes. Bottom cover 81 serves to hide the various pins and screws otherwise visible beneath bottom plate 61. These include dowel or taper pins 82 provided to maintain alignment between the separately machined components of power divider 30 and screws 83 and are employed to attach bottom plate 61 to housing 60. If desired, detents (not shown) may be positioned within channel 76b to facilitate rapid orientation of switching member 36 to preselected angular positions.

The design feature illustrated in FIGURES 12 and 13 is utilized to reduce RF leakage from waveguide 35 along the surfaces of rotors 77a and 77b. In particular, note that shallow troughs 85a, 85b and 85c extend downwardly within housing 60 from the surface against which upper rotor 77a abuts. (In FIGURE 12, of course, neither rotor 77a nor switching member 36 is shown.) A similar set of shallow troughs 86 extend upward within housing 60 from the surface 87 against which rotor 77b abuts. Troughs 85 and 86 generally are contoured to match the curvature of the walls of waveguide 35 and opening 63 (which receives switching member 36). In a preferred embodiment, troughs 85 and 86 each have a depth of about one-eighth inch.

Troughs 85 and 86, and grooves 87 extending therefrom into region 63, all are filled with an RF absorptive material 88. Such lossy materials are well known to those skilled in the art and are typified by the material sold by Emerson & Cummings under the mark MF-124. Material 88 is somewhat plastic in consistency and presses against rotors 77a and 77b, effectively eliminating as an RF leakage path the gap between housing 60 and rotors 77a and 77b. Moreover, by reducing RF leakage between waveguide branches 35a and 35b, RF absorptive material 88 significantly increases the isolation of power divider 30. Typically, an improvement in isolation of from one and one-half to one or two to one is obtained using absorptive material 88, as compared with a switch constructed without the material.

It has been found that no significant improvement in isolation results from extending grooves 87 down the inside of region 63. As with troughs 85 and 86, if grooves 87 extend to a depth of about one-eighth inch from the top and bottom surfaces of housing 60, good isolation is obtained.

The inventive power divider 30 offers the combined features of having its output ports 32 and 33 at right angles to input port 31, and thus functions as the equivalent of a T-type divider while having small size. These combined features are accomplished with minimum power loss and minimum voltage standing wave ratio (VSWR) by utilizing a compound curvature for the side walls of waveguide 35. This compound curvature is illustrated in FIGURES 7 and 8.

Figures 7, 14, 15:
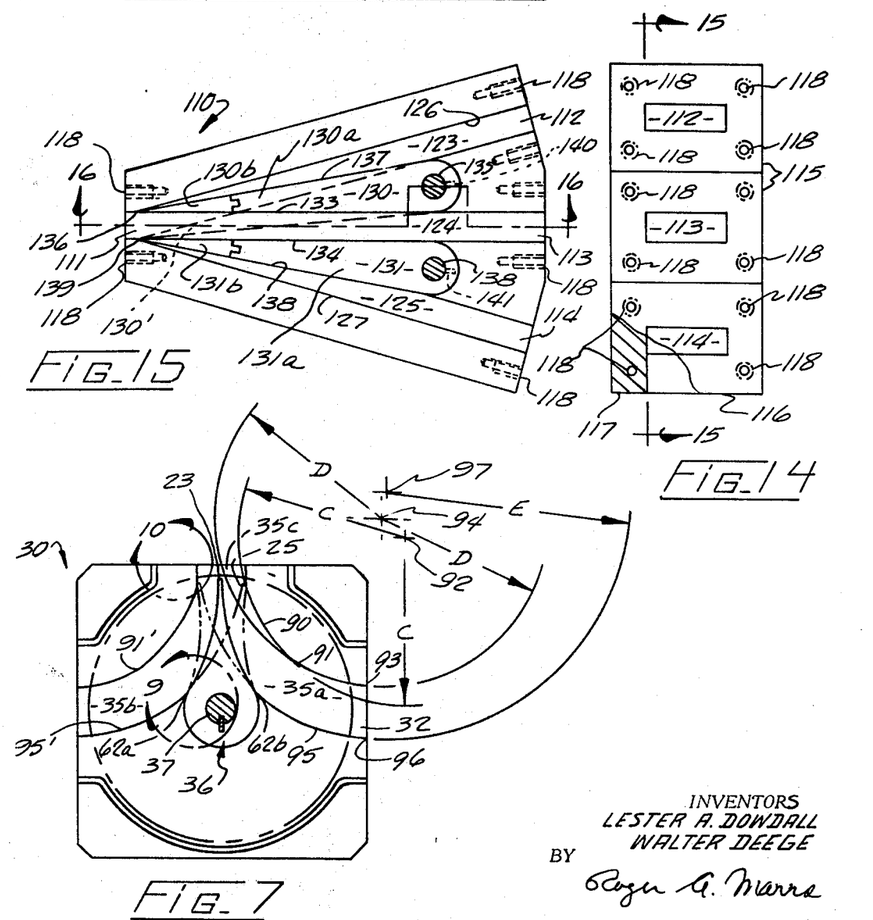
FIGURE 7 is a simplified top view of the inventive wagevuide power divider showing the compound curvature of the waveguide walls.
FIGURE 14 is a front elevation view of another embodiment of the inventive microwave power divider having three input or output ports.
FIGURE 15 is a sectional view of the microwave power divider illustrated in FIGURE 14 as viewed generally along lines 15—15 thereof.
Figure 8:
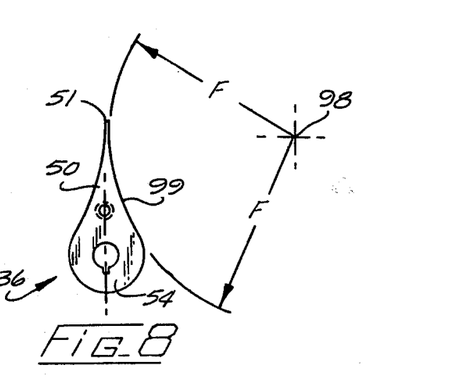
FIGURE 8 is a top view of the switching member as shown in FIGURE 3, illustrating the curvature of its arcuate sides.

Referring to FIGURE 7, note that outer wall 90 of waveguide branch 35a is defined by two intersecting arcs. In the region between position 25 and intersection point 91, the curvature of wall 90 is defined by an arc of a circle having radius C and centerpoint 92. Similarly, the curvature of wall 90 in the region between intersection point 91 and point 93 (adjacent output port 32) is defined by the arc of a circle having radius D and centerpoint 94. The radii C and D, and the location of centerpoints 92 and 94 are empirically determined to provide minimum VSWR for power divider 30; of course, the dimensions depend also on the frequency of operation of the device.

Referring still to the compound curvature of outer wall 90 of waveguide 35, it has been found that very low VSWR results when the radius C is equal to the radius D, and when center point 92 is situated so that a radius drawn from center point 92 to axis 37 lies at a 45° angle to another radius drawn from axis 37 through blade position 23 as shown in FIGURE 7. Center point 94 is located to insure that the distance between the center of output port 32 and point 93 is equal to $b/2$, with a line through centers of output ports 32 and 33 intersecting axis 37.

Inner wall 95 of waveguide branch 35a also exhibits compound curvature, in part defined by the curvature of blade 50. As seen in FIGURE 7, in the region between finger 62b and point 96 (adjacent output port 32) the curvature of inner wall 95 is defined by an arc having radius E and center point 97. Radius D is greater than either of radii C or D, and center point 97 is selected so that point 96 is at a distance of $b/2$ from the center of output port 32.

The curvature of the sides of the blade portion 50 of switching member 36 is illustrated in FIGURE 8. As seen therein, this curvature is defined by an arc having radius F and center point 98. Radius F need not be equal to radius E; however, radius F preferably should be of sufficient magnitude so that surface 99 between tip 51 and cylindrical portion 54 may be defined by a single arc.

Referring again to FIGURE 7, note that waveguide 35 is symmetric. That is, the curvature of inner and outer walls 95' and 91' of waveguide branch 35b (see FIGURE 7) are defined by arcs identical to those defining the compound curvature of walls 91 and 95.

While the arcs defining the curvature of walls 91, 95 and 99 have been shown in FIGURES 7 and 8, as being arcs of a circle, the invention is not so limited. For example, outer wall 91 may be defined by other than circular arcs.

Although the width of each of input ports 31 and output ports 32 and 33 is equal to $b$, due to the compound curvature, this exact width is not maintained through the entire length of waveguide branches 35a and 35b. However, since the electric field is parallel to the top and bottom of waveguide 35, this slight variation in width causes only negligible distortion of the signal being propagated. Moreover, there are no bumps or abrupt discontinuities in waveguide 35 despite its compound curvature. Thus, waveguide 35 presents very little impedance mismatch to an input signal and resultantly, power divider 30 has a very low VSWR.

As an added benefit, the compound curvature of waveguide 35 permits output ports 32 and 33 to be situated at right angels with respect to input port 31. At the same time, the overall length and width of power divider 30 is significantly smaller than if a single continuous curve were used to define the shape of waveguide 35.

Figure 9:
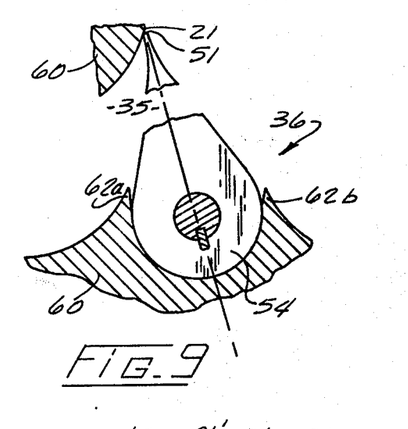
FIGURE 9 is a sectional view of the switching member and power divider housing as seen generally along line 9—9 of FIGURE 7.

To insure maximum isolation of the input signal from the non-selected output port when power divider 30 is used as a switch, it is important that tip 51 of switching member 36 makes continuous contact with the wall of waveguide 35 adjacent input port 31. As shown in FIGURE 9, fingers 62a and 62b are notched slightly to insure that they will not dig into the side of switching member 36 as it is rotated to the extreme positions 21 (shown in FIGURE 9) and 25. Were these notches not provided, tip 51 may be prevented from completely contacting the wall of waveguide 35 when switching member 36 is rotated to position 21 or 25. By restricting the maximum gap size between fingers 62a and 62b and cylindrical portion 54 of switching member 36 to .002 inch, RF reflections due to the fingers are minimized. Consequently, VSWR also is minimized.

Referring still to FIGURE 9, note typically that the width of tip 51 of switching member 36 is on the order of .006 to .008 inch. Thus, when tip 51 is seated against the wall of waveguide 35, tip 51 appears as a bump extending into waveguide 35. This situation is undesirable, as the bump constitutes a discontinuity which may appear as an impedance mismatch to an input signal. The configuration of FIGURE 10 may be used to eliminate this problem.

Referring to FIGURE 10, note that housing 60 has been provided with notches 100a and 100b at the locations where tip 51 of switching member 36 contacts the walls of waveguide 35. As shown, when switching member 36 is located at position 21, tip 51 seats within notch 100a. Preferably, notch 100a has a depth equal to the width of tip 51, so that a smooth surface results comprising waveguide 91' and curved side 99 of blade portion 50 of switching member 36. This completely eliminates the bump within the wall of waveguide 35 on the side where switching member 36 is positioned. On the opposite side, since notches 100a and 100b extend into the walls of waveguide 35, reflection of the input signal and hence degradation of the VSWR, also is minimal. RF leakage has been eliminated since the vane is buried in the housing and there is no linear path for it to follow.

In certain applications, for example, when power divider 30 is used as a fail-safe switch, switching member 36 must be moved very rapidly between positions 21 and 25. In this instance, top 50 may strike the wall of the waveguide with some force, possibly bouncing or causing wear of the wall. To reduce this problem, and to insure that the entire height of tip 51 makes positive contact with the wall 91 or 91' when at position 21 or 25, the forward portion 36a or switch member 36 may be made of a flexible material. Such an embodiment is shown in FIGURE 17.

Referring to FIGURE 17, switching member 36' comprises a body 36a which may be fabricated of aluminum, stainless-steel, copper or the like. Forward member 36b preferably is fabricated of resilient material such as beryllium copper. A tongue 101 on member 36b mates into a groove 102 on body 36a and is held in place by dowel or tapered pins 103 which fit through holes 104 and 105. The curvature of the sides of switching member 36', of course, is the same as that illustrated for switching member 36 in FIGURE 8.

As shown in phantom at 36b' in FIGURE 17, forward member 36b may flex with respect to body 36a. Thus, when switching member 36' is quickly rotated to position 21 or 25, the striking force exerted against tip 51 will be absorbed by flexure in member 36b and tip 51 quickly will come to rest firmly against the waveguide wall. By maintaining a slight additional rotational force on switching member 36, tip 51 may be maintained in intimate contact with the waveguide wall over its entire height. This will insure maximum isolation of power divider 30 when used in the switching mode.

Figure 18:
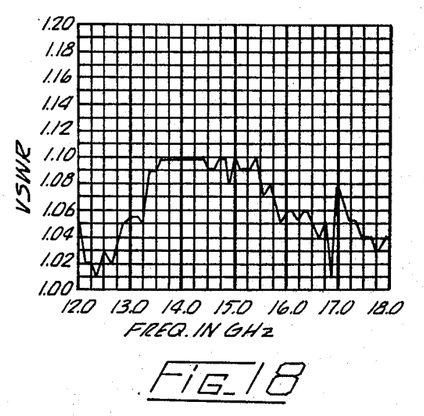
FIGURES 18–21 are graphs of voltage standing wave ratio (VSWR) as a function of frequency for various embodiments of the inventive microwave power divider as illustrated in FIGURES 1–14.
Figure 19:
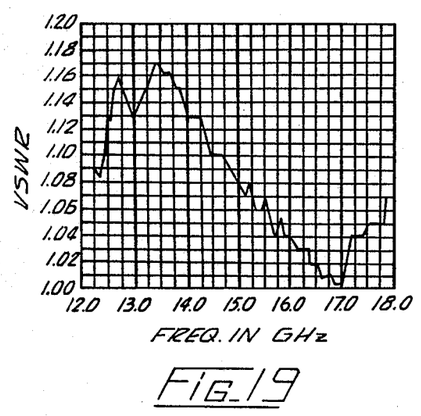
Figure 20:
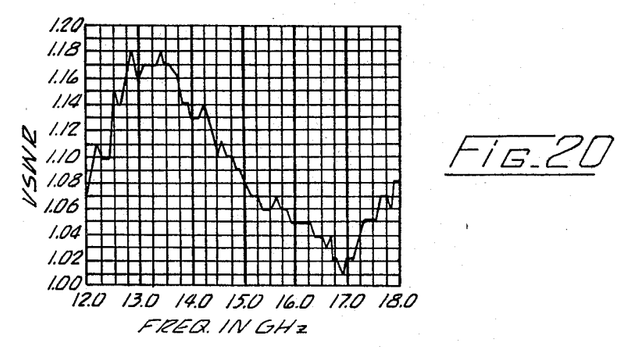

The excellent voltage standing wave ratio characteristics or inventive microwave power divider 30 are illustrated by the graphs of VSWR vs. frequency in FIGURES 18-21. FIGURES 18-19, and 20 show typical VSWR characteristics of a KU band power divider of the type illustrated in FIGURE 6. The measurements were made on a power divider having the compound curvature illustrated in FIGURES 8 and 9 and without including the RF absorptive material illustrated in FIGURES 12 and 13, without the notches illustrated in FIGURE 10 or the flexible switching member shown in FIGURE 17. With these latter features included, the characteristics of the power divider would be vastly improved.

Referring first to FIGURE 18, VSWR as a function of frequency is shown with switching member 36 located at position 21. (The VSWR curve for position 25 is identical.) Note that VSWR does not exceed 1.10:1 over the entire KU band frequency range of 12 gHz. or 18 gHz. For example, the value of the above statement can be better appreciated in that a magnetron or other transmitter tubes can attain a maximum ratio of 1.5:1 VSWR before catastrophic failure occurs.

FIGURE 19 shows the VSWR for power divider 30 with switching member 36 located at midposition 23; recall that in position 23 the input power is divided equally between the two output ports 32 and 33. The VSWR measured was less than 1.18:1 over the entire KU band.

FIGURE 20 shows a graph of VSWR as a function of frequency with switching member 36 at position 22 or 24. That is, switching member 36 is positioned to provide a power output of —5.4 db at one output port and of —1.6 db at the other output port. Note again that the VSWR is less than 1.18:1 over the entire frequency range 12 to 18 gHz.

Figure 21:
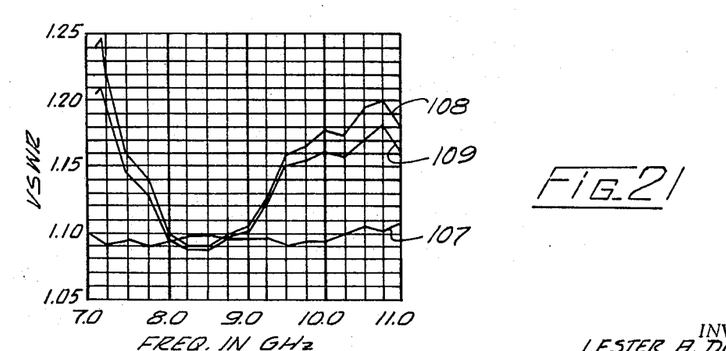

FIGURE 21 shows various curves of VSWR as a function of frequency for power divider 30, constructed as shown in FIGURE 6, but designed for operation in the B band. Curve 107 represents the VSWR measured with switching member 36 at position 21 or 25. A VSWR of less than 1.11:1 was measured over the entire frequency range of 7 to 11 gHz. Curves 108 and 109 show the VSWR measured with switching member 36 located respectively at positions 22 and 24. In each case, a maximum VSWR of less than 1.25:1 was noted. Although not shown in FIGURE 21, the VSWR measured with switching member 36 at midposition 23 yielded values which fell between curves 108 and 109. Again, a maximum of less than 1.25:1 was recorded.

Figure 16:
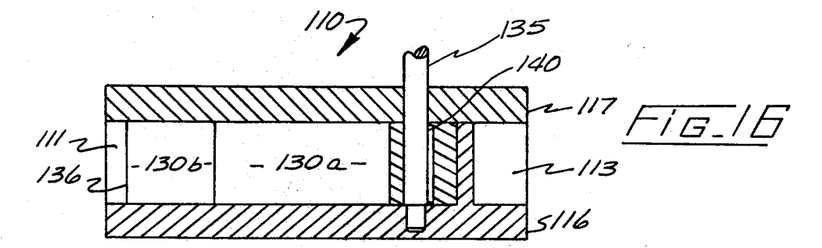
FIGURE 16 is a sectional view showing constructional features of the switching members utilized in the microwave power divider of FIGURE 14 as viewed generally along lines 16—16 of FIGURE 15.

Another embodiment of the inventive microwave power divider is illustrated in FIGURES 14, 15 and 16; this embodiment facilitates selectively dividing a single RF signal between three output ports. Alternatively, signals from three sources may selectively be switching to a single output port.

Referring to FIGURES 14 and 15, note that waveguide 110 comprises input port 111 and output ports 112, 113 and 114. (Of course, ports 112, 113 and 114 may be used as input ports, and port 111 used as the output port.) Each output port is provided with an appropriate flange 115 to facilitate connection with associated microwave circuitry; a similar flange (not shown) is provided for input port 111. Flanges 115 are attached to waveguide housing 116 and bottom plate 117 by means of screws 118.

Power divider 110 includes waveguides 123, 124 and 125. Wall 126 of waveguide 123 and wall 127 of waveguide 125 each are straight, and extend between input port 111 and output ports 112 and 114 respectively.

Situated within power divider 110 between waveguide 123 and 124 is first switching member 130; second switching member 131 is situated between waveguide 124 and 125. Each of the switching members 130 and 131 has substantially linear sides, thus when positioned as shown in FIGURE 15, input port 111 is connected to output port 113 via straight waveguide 124, a portion of which is formed by sides 133 and 134 of switching members 130 and 131.

To connect an input signal from port 111 to output port 112, switching member 130 is rotated counterclockwise about shaft 135 until it reaches the position shown in phantom at 130' (see FIGURE 15). Tip 136 is then in contact with side 134 of waveguide 124 adjacent port 111. The angle between the side 133 and side 137 of switching member 130 is selected so that in position 130', side 136 will be parallel to wall 126 of waveguide 123.

In a similar manner, to direct all of an input signal provided at port 111 to output port 114, switching member 130 is maintained with tip 136 against wall 126, and switching member 131 is rotated clockwise about shaft 138 until tip 139 touches side 133 of waveguide 124. The angle between sides 134 and 138 of switching member 131 is selected so that in this position, side 138 is parallel to wall 127 of waveguide 125.

To distribute an input signal at port 111 between more than one output port, one or both of switching members 130 and 131 is positioned intermediate the edges of port 111. For example, if switching member 131 remains as shown in FIGURE 15, and switching member 130 is rotated so that tip 136 is located at the center of input port 111, an input signal will be divided equally between output ports 112 and 113. Similarly, should both switching members 130 and 131 be positioned partway between the edges of input port 111, an incoming signal will be divided between each of the three output ports 112, 113, and 114. The power division will be in the ratio of the spacing between a first edge of port 111, tip 136, tip 139, and the other edge of port 111.

For the same considerations discussed hereinabove in conjunction with FIGURE 17, it is advantageous to construct switching members 130 and 131 in two parts. As shown in FIGURES 15 and 16, switching member 130 comprises body portion 130a and forward portion 130b. Body 130a may be made of aluminum, stainless steel, copper or the like. Preferably, forward member 130b is made of a flexible material such as beryllium-copper; thus, member 130 will flex somewhat when tip 136 forcibly strikes an edge of port 111. Body portion 130a is keyed to shaft 135 by key 140.

Switching member 131 is identical to member 130, comprising body portion 131a and flexible forward portion 131b. Body portion 131a is keyed to shaft 138 by key 141.

While particular embodiments of the present invention have been shown and described, changes and modifications may be made without departing from this invention.

What is claimed is:

1. A microwave power divider comprising:
   a housing defining a waveguide having two branches;
   first and second disc-shaped rotors coaxially rotatably disposed respectively atop and below said waveguide so as to define the top and bottom of said waveguide; and
   a switching member fixedly attached between said rotors, said member comprising a substantially cylindrical portion coaxial with said rotors, and a blade portion gradually and arcuately tapering away from said cylindrical portion to a tip, said member forming an angularly positionable partition within the region of said waveguide common to said two branches.

2. A microwave power divider as defined in claim 1 wherein the opposite sides of said blade and the opposing walls of said waveguide exhibit compound curvatures.

3. The invention as defined in claim 1 wherein said waveguide is defined by opposing sidewalls composed of compound curvatures, said curvatures being effective to provide minimum distortion of electrical energy signals introduced into said waveguide.

4. The invention as defined in claim 3 wherein the stationary portion of the inner wall of each of said branches is arcuate and terminates adjacent said cylindrical portion whereby the inner wall compound curvature is defined by the curvature of said stationary portion and the curvature of said arcuate blade.

5. The invention as defined in claim 1 wherein angular orientation of said rotors causes said tip to be positioned between first and second outer walls of said common region of said waveguide thereby dividing an input electrical energy signal between said two branches in proportion to the distance of said tip from said first and second walls.

6. The invention as defined in claim 5 wherein said walls are selectively notched whereby seating of said tip in one of said notches causes said wall and a selected side of said blade to define a smooth surface.

7. The invention as defined in claim 1 wherein said tip constitutes a flexible extension secured to said cylindrical portion of said switching member.

8. The invention as defined in claim 7 wherein said tip extension is composed of beryllium copper.

9. The invention as defined in claim 7 wherein said flexible tip region is composed of beryllium copper, and wherein the remainder of said partition is of a material selected from the class consisting of aluminum, copper and stainless steel.

10. A microwave power divider adapted to receive an electrical energy signal and to effectively divide the received signal into predetermined energy levels for distributing each of the energy levels to separate loads comprising:
    a housing having internally formed channels defining a branched waveguide comprising a signal input common channel leading into a pair of outwardly diverging signal output channels;
    said common input channel having opposing sidewalls merging with said pair of output channels so as to constitute respective outer sidewalls of each of said output channels;
    each of said output channels having an inner sidewall opposing a respective outer sidewall and each inner sidewall terminating at one end in a junction area dividing said common input channel into said pair of output channels;
    a switching member pivotally carried on said housing at said junction area and having a blade portion extending into said common input channel;
    said blade portion being formed with opposite sidewalls coextensive with said inner sidewalls; and
    said common input channel opposing sidewalls being defined by a first curvature while said output channel outer sidewalls are defined by a second curvature and wherein each of said output channel inner sidewalls is defined by a third curvature and said blade portion opposite sidewalls are defined by a fourth curvature so that said branched waveguide is formed by continuous spaced apart opposing sidewalls exhibiting compound curvatures to provide minimum distortion of electrical energy introduced into said common input channel.

11. The invention as defined in claim 10 wherein said housing is formed with a pair of notches separated by said switching member at the interface of the merger between each of said output channel inner sidewalls and said blade portion opposite sidewalls so as to permit said switching member to pivot about its axis without binding against said housing.

12. The invention as defined in claim 10 wherein said common input channel opposing sidewalls are provided with a minute notch adapted to receive the extreme tip of said blade portion when said switching member is pivoted so as to provide a continuous and substantially uninterrupted sidewall.

13. The invention as defined in claim 10 wherein each of said blade portion sidewalls is formed with a recess for rotatably mounting an elongated roller having its outer periphery rollably engageable with an adjacent housing sidewall.

14. The invention as defined in claim 10 wherein said switching member is fixed on a shaft rotatably mounted on said housing; and
means mounted on said housing operably coupled to said shaft for selectively positioning said blade portion to one of a plurality of predetermined location within said common input channel.

15. The invention as defined in claim 14 including resilient means disposed in each of recesses adapted to bias said rollers outwardly into forcible contact with each of said adjacent housing sidewalls respectively.

16. The invention as defined in claim 10 including a pair of rotors rotatably mounted on said housing and having opposing surfaces constituting the top and bottom walls of said branched waveguides and separated by said switching member; and
means for connecting said rotors to said switching member wherein said rotors and said switching member rotate in unison as a unitary structure.

17. The invention as defined in claim 16 wherein said housing includes shallow cavities formed therein adjacent each of said pair of rotors; and
lossy material disposed within said cavities so as to fully occupy the space therein.

18. A microwave power switch comprising:
a housing formed with an internal diverging waveguide defined by opposing sidewalls adapted to receive an electrical energy signal at one end thereof via a plurality of signal input ports and to propagate said signal from its other end via a single output port;
a pair of pivotal wedge-shaped switching members movably disposed between said opposing sidewalls within said waveguide and arranged in a side-by-side spaced apart relationship and having their respective pivot axes lying in the same plane in offset relationship with respect to any of said input ports;
each of said switching members adapted to be independently actuated to alter the propagation and power of said signal so as to be selectively combined into a single switching member or cooperatively related separately between selected ones of said plurality of signal input ports.

19. The invention as defined in claim 18 wherein said output port is parallel to a selected one of said input ports and the other one of said input ports are angularly related to said selected one of said input ports.

20. The invention as defined in claim 18 wherein each of said switch members includes a thickened portion pivotally carried on said housing and a tapered portion extending from said thickened portion to terminate in a tip.

21. The invention as defined in claim 20 wherein said tip is detachably mounted on said tapered portion.

22. A microwave power switch comprising:
a housing formed with an internal diverging waveguide adapted to receive an electrical energy signal at one end thereof via a plurality of signal input ports and to propagate said signal from its other end via a single output port;
a pair of pivotal switching members movably disposed within said waveguide and arranged in a side-by-side spaced apart relationship and having their respective pivot axes lying in the same plane;
each of said switching members includes a resilient blade portion adapted to flex upon contact with the sidewalls of said waveguide responsive to pivotal movement of said switching members; and
each of said switching members adapted to be independently actuated so as to be selectively combined into a single switching member or cooperatively related separately between selected ones of said plurality of signal input ports.

23. A microwave power divider comprising:
a housing having internal opposing sidewalls defining a branched waveguide for propagating electrical energy extending from a common input port, and first and second branches of said waveguide terminating respectively in first and second output ports being at right angles to said input port;
an arcuate-sided switching member movably mounted on said housing at the juncture of said branched waveguide so as to provide an angularly positionable partition adapted to selectively divide the electrical energy being propagated;
said opposing sidewalls of said branched waveguide and said opposite arcuate sides of said switching member form complementary compound curvatures; and
the compound curvature of the outer wall of each of said branches is defined by two intersecting arcs, wherein the curvature of the inner wall of each of said branches is defined by another arc, and wherein said inner walls terminate adjacent said switching member opposite sides respectively.

24. The invention as defined in claim 23 wherein said switching member comprises a substantially cylindrical portion truncated parallel to its axis and a blade portion extending from said truncation in a plane parallel to said axis, the opposite sides of said blade portion each being defined by the right projection of an arc of a circle.

25. The invention as defined in claim 23 wherein said intersecting arcs comprise the arcs of overlapping circles.

26. The invention as defined in claim 25 wherein said overlapping circles each have the same diameter.

27. A microwave power divider comprising:
a housing having internal opposing sidewalls defining a branched waveguide for propagating electrical energy;
a switching member pivotally mounted on said housing at the juncture of said branched waveguide and including a substantially cylindrical portion and a blade portion gradually and arcuately tapering away from said cylindrical portion to a tip, said member constituting an angularly positionable partition within the region of said waveguide common to said branches thereof; and
the outer wall of said branch sidewalls being defined by two intersecting arcs, the inner wall of said branch sidewalls being defined by another arc, and said inner walls terminate adjacent said switching member opposite sides respectively.

28. The invention as defined in claim 27 including:
a portion of said housing being rotatably mounted thereon so as to define a part of said waveguide; and
means securing said portion to said switch member so that said switch member pivots in response to rotation of said portion.

29. The invention as defined in claim 27 including means rotatably carried on said housing and secured to said switch member for pivotally positioning said switch member.

References Cited
UNITED STATES PATENTS

| | | | |
|---|---|---|---|
| 2,715,210 | 8/1955 | McClain | 333—7 |
| 2,827,613 | 3/1958 | Robison et al. | |
| 3,009,117 | 11/1961 | Lanctot | 333—7 |
| 3,227,969 | 1/1966 | Bentley | 333—7 |

HERMAN KARL SAALBACH, Primary Examiner

P. L. GENSLER, Assistant Examiner

U.S. Cl. X.R.

333—9, 98